United States Patent
Mitsuhashi et al.

[11] Patent Number: 6,157,675
[45] Date of Patent: Dec. 5, 2000

[54] IMAGE TRANSMISSION DEVICE AND IMAGE TRANSMISSION METHOD

[75] Inventors: Satoshi Mitsuhashi, Tokyo; Tomohiko Sakamoto, Kanagawa, both of Japan

[73] Assignee: Sony Corporation, Tokyo, Japan

[21] Appl. No.: 09/054,160

[22] Filed: Apr. 2, 1998

[30] Foreign Application Priority Data

Apr. 4, 1997  [JP]  Japan ................................. 9-086802

[51] Int. Cl.⁷ .................................. H04B 1/66; H04N 7/12
[52] U.S. Cl. .................................................. 375/240.01
[58] Field of Search ................................. 348/7, 8, 10, 12, 348/13, 17, 18, 19, 405, 416, 419, 473, 485, 845, 423, 416.1; 709/217, 218, 219; 358/412, 133; 364/56 R; 379/53; 375/240.01, 240.13; H04N 7/12; H04B 1/66

[56] References Cited

U.S. PATENT DOCUMENTS

| | | | |
|---|---|---|---|
| 4,093,962 | 6/1978 | Ishiguro et al. ........................ 348/405 |
| 4,517,596 | 5/1985 | Suzuki ................................... 358/133 |
| 4,953,196 | 8/1990 | Ishikawa et al. ......................... 379/53 |
| 5,675,386 | 10/1997 | Lee et al. ................................ 348/416 |
| 5,677,969 | 10/1997 | Auyeung et al. ........................ 382/239 |
| 5,717,464 | 2/1998 | Perkins et al. ........................... 348/419 |
| 5,757,668 | 5/1998 | Zhu ...................................... 364/514 R |
| 5,892,881 | 4/1999 | Takishima et al. ........................ 386/52 |
| 5,946,104 | 8/1999 | Yoshida ................................. 358/412 |

*Primary Examiner*—Chris S. Kelley
*Assistant Examiner*—Tung Vo
*Attorney, Agent, or Firm*—Limbach & Limbach L.L.P.; Seong-Kun Oh

[57] ABSTRACT

An image transmission device for transmitting the encoded data obtained by encoding the data of an image through a transmission line of a predetermined transmission rate comprises a transmission unit for transmitting the encoded data and a controller for controlling the transmission unit to transmit the data which instructs to generate a copy picture copying a picture corresponding to the encoded data transmitted previously based on the difference between the bit rate of the encoded data and the predetermined transmission rate, in place of the encoded data to be transmitted originally.

12 Claims, 7 Drawing Sheets

IMAGE TRANSMISSION DEVICE AND IMAGE TRANSMISSION METHOD

BACKGROUND OF THE INVENTION

The present invention relates to an image transmission device and an image transmission method and in particular it relates to an image transmission device and an image transmission method, in which the encoded data obtained by encoding the data of an image are transmitted through a transmission line of a predetermined transmission rate without using an encoder for obtaining the encoded data with a bit rate corresponding to the transmission rate of a transmission line.

For example, broadcasting a motion picture utilizing the Internet has been rapidly spread in the market. A motion picture is generally transmitted by being compressed and encoded because it requires an enormous quantity of data when a motion picture is transmitted as it is. As an encoding system for a motion picture, for example, MPEG (Moving Picture Experts Group) is known.

SUMMARY OF THE INVENTION

Users receive encoded data obtained in encoding the data of a motion picture from a server on the Internet through a predetermined transmission line and watch the motion picture in decoding the encoded data, and as a transmission line connecting the internet and the users (terminals such as computers used by the users), there are, for example, analog networks (for example a PSTN (Public Switched Telephone Network, etc.) and digital networks (for example,. ISDN (Integrated Service Digital Network) or Ethernet, etc.), and the each transmission line has different transmission rate (transmission bandwidth) from each other.

On the other hand, in a case where, for example, a real time broadcasting is performed utilizing the internet, image data have to be encoded at a bit rate less than the transmission rate of the transmission line.

Therefore, when there are a plurality of kinds of transmission lines connected to users, it is necessary to prepare encoders which perform encoding at the bit rates corresponding to the transmission rates of respective transmission lines. In this case, in spite of the transmission of the encoded data of an identical picture, it is necessary to prepare encoders which output encoded data of bit rates corresponding to respective transmission rates, and, as a result, the cost of the whole system becomes high. (A system is a logical congregation of a plurality of devices and it doesn't matter whether they are housed in a container or not.) This holds true even though the mode of the broadcast is a uni-cast or a multi-cast.

For example, on Apr. 1, 1997, as a URL (Uniform Resource Locator), on the home page obtained by designating http://www.comp.lancs.ac.uk/computing/users/njy/demo.html, there is disclosed a service for transmission (QOS (Quality Of Service)) in which the data concerning a B picture or P picture are simply thinned out from among the encoded data obtained in MPEG-encoding picture data.

However, in a case where B picture and P picture are simply thinned out, the number of pictures becomes less than the original number of pictures, and in the result, when such encoded data are decoded with an ordinary decoder based on the MPEG rating, the picture obtained is similar to that when a rapidly traversed picture is played back. In other words, in order to obtain a normal picture from the encoded data in which pictures are simply thinned out, a decoder to be exclusively used for such encoded data is necessary. For example, at URL, on a home page obtained by designating http://www.nettoob.com, there is offered an encoder to be exclusively used for regenerating a normal picture from the encoded data in which pictures are simply thinned out.

The present invention was invented in consideration of such circumstances, and it makes it possible to obtain the encoded data of a desirable bit rate by changing the bit rate of the encoded data without changing the number of pictures without using an encoder to obtain encoded data of a bit rate corresponding to the transmission rate of the transmission line.

An image transmission device of the present invention is provided with a control means which makes the transmission means to transmit the data which instruct to generate a copy picture by copying a picture corresponding to the previously transmitted encoded data based on the difference between the bit rate of the encoded data and the predetermined transmission rate, in place of the encoded data which should be transmitted originally.

An image transmission method of the present invention is the one which transmits data instructing to generate a copy picture copying a picture corresponding to the previously transmitted encoded data based on the difference between the bit rate of the encoded data and the predetermined transmission rate, in place of the encoded data which should be transmitted originally.

In an image transmission device of the present invention the transmission means is made to transmit the data instructing to generate a copy picture copying a picture corresponding to the previously transmitted encoded data based on the difference between the bit rate of the encoded data and the predetermined transmission rate, in place of the encoded data which should be transmitted originally.

In an image transmission method of the present invention it is arranged to transmit the data instructing to generate a copy picture copying a picture corresponding to the previously transmitted encoded data based on the difference between the bit rate of the encoded data and the predetermined transmission rate, in place of the encoded data which should be transmitted originally.

According to the image transmission device and method of the present invention, the data instructing to generate a copy picture copying the picture corresponding to the previously transmitted encoded data based on the difference between the bit rate of the encoded data and the predetermined transmission rate, in place of the encoded data which should be transmitted originally. Therefore, when the encoded data are transmitted through a transmission line of the predetermined transmission rate, the preparation of an encoder for obtaining the encoded data of the bit rate corresponding to the transmission rate can be dispensed with.

DETAILED DESCRIPTION OF THE PREFEERED EMBODIMENT

In the following, embodiments according to the present invention will be explained. Before that, as a preparatory stage, the principle of the present invention will be explained. In this place, it is assumed that the encoded data obtained in performing MPEG-encoding (encoding based on the ratings of MPEG) are to be transmitted.

Figure 1:
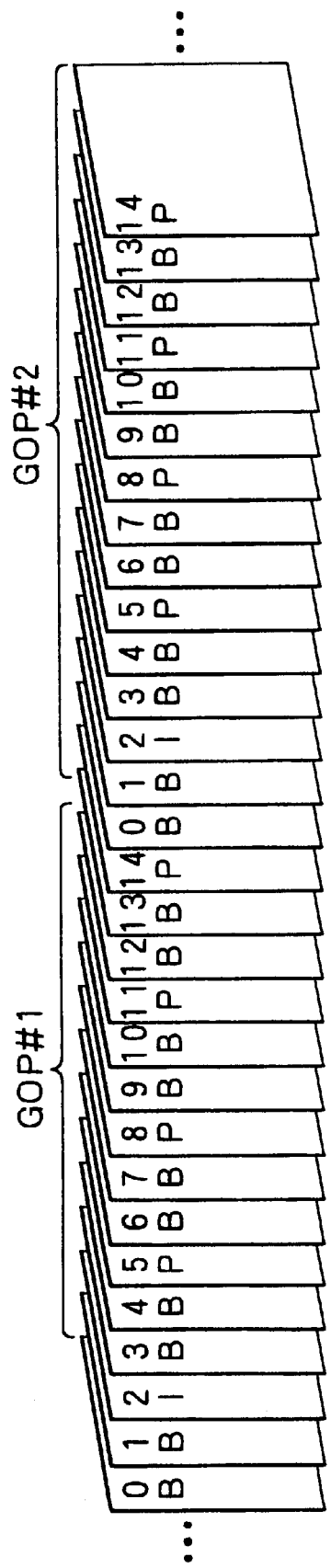
FIG. 1 shows an example of the constitution of GOP.

In MPEG, for random access, etc., for example, as shown in FIG. 1, a GOP (group of pictures) being constituted with a plurality of consecutive pictures is defined. In the embodiment shown in FIG. 1, each GOP is constituted with 15 pictures.

In FIG. 1, the picture types of respective pictures, that is, the types of respective pictures, I picture, P picture or B picture, are shown with the first letters of picture types (I, P or B), and the display order of pictures constituting each GOP is shown with sequential numerals from 0. In the case of inter-frame-estimation-encoded pictures such as B pictures or P pictures, in each macro-block, the bit stream is constituted with an estimated vector and differential information corresponding to the macro-block type.

In a case where a bit rate of encoded data is lowered by simply thinning out pictures constituting a GOP, the number of pictures which constitute the GOP becomes smaller than the original number of pictures, so that when it is decoded, as aforesaid, a picture like that of rapid traverse playback is obtained.

In MPEG, the data (hereinafter referred to as a copy picture) which instruct to generate a copy picture copying a picture corresponding to the previously transmitted encoded data are prescribed. It is prescribed in the MPEG regarding P pictures and B pictures such that such data can be used; however in this case, regarding an I picture it will be admitted to use such data, and the bit rate of the encoded data can be lowered by using the copy pictures. In other words, the copy picture instructs to generate a copy picture copying the picture corresponding to the previously transmitted encoded data, and all macro-blocks in the picture are encoded with the estimation vector (0,0) assuming that there is no differential information, and since the quantity of data is small, the bit rate of the encoded data can be lowered by transmitting the copy picture in place of the encoded data to be transmitted originally.

To be concrete, the data quantity of the encoded data can be lowered as shown in the following by replacing the I picture, P pictures or B pictures with copy pictures. In other words, for example, in a case where a GOP is constituted as shown in FIG. 1, the data quantity of the encoded data can be decreased to approximately 10 frames (pictures)/sec by replacing only B pictures with copy pictures, and further by also replacing P pictures with copy pictures the data quantity of the encoded data can be decreased to approximately 2 frames/sec, and adding to this, when I pictures are also replaced with copy pictures, the data quantity of the encoded data can be decreased to approximately 1 frame/sec.

In the embodiment shown in FIG. 1, in each GOP, only (1) I picture is contained, and in a GOP, more than (1) I picture is necessary, so that, for example, in FIG. 1, when the I picture constituting the GOP #2 is replaced with a copy picture, the pictures constituting the GOP #2 are, for example, moved to constitute the GOP #1 together with the pictures constituting the GOP #1. Therefore, in this case, the GOP #2 does not exist and the GOP #1 is constituted with 30 pictures. However, in this case, it is assumed that the I picture which constitutes the original GOP #1 is not replaced with a copy picture (If the I picture which constitutes the original GOP #1 is also replaced with a copy picture, the pictures constituting GOP #1 and GOP #2 are put together to constitute the previous GOP of the GOP #1.).

The bit rate of the encoded data after the replacement with copy pictures basically depends upon the data quantity of the I picture. However, in order to keep the bit rate approximately constant, as occasion demands, not only B pictures but also, P pictures and I pictures may be replaced with copy pictures.

However, since it is not prescribed to use the copy picture about the I picture in MPEG, when a copy picture is to be used for the I picture, the picture type has to be changed to the P picture or the B picture to make the system conform to the ratings of MPEG.

Owing to the principles as mentioned in the above, the bit rate of the encoded data can be changed without changing the number of pictures; therefore, it is made possible to obtain encoded data of a bit rate corresponding to the transmission rate of a transmission line.

Figure 2:
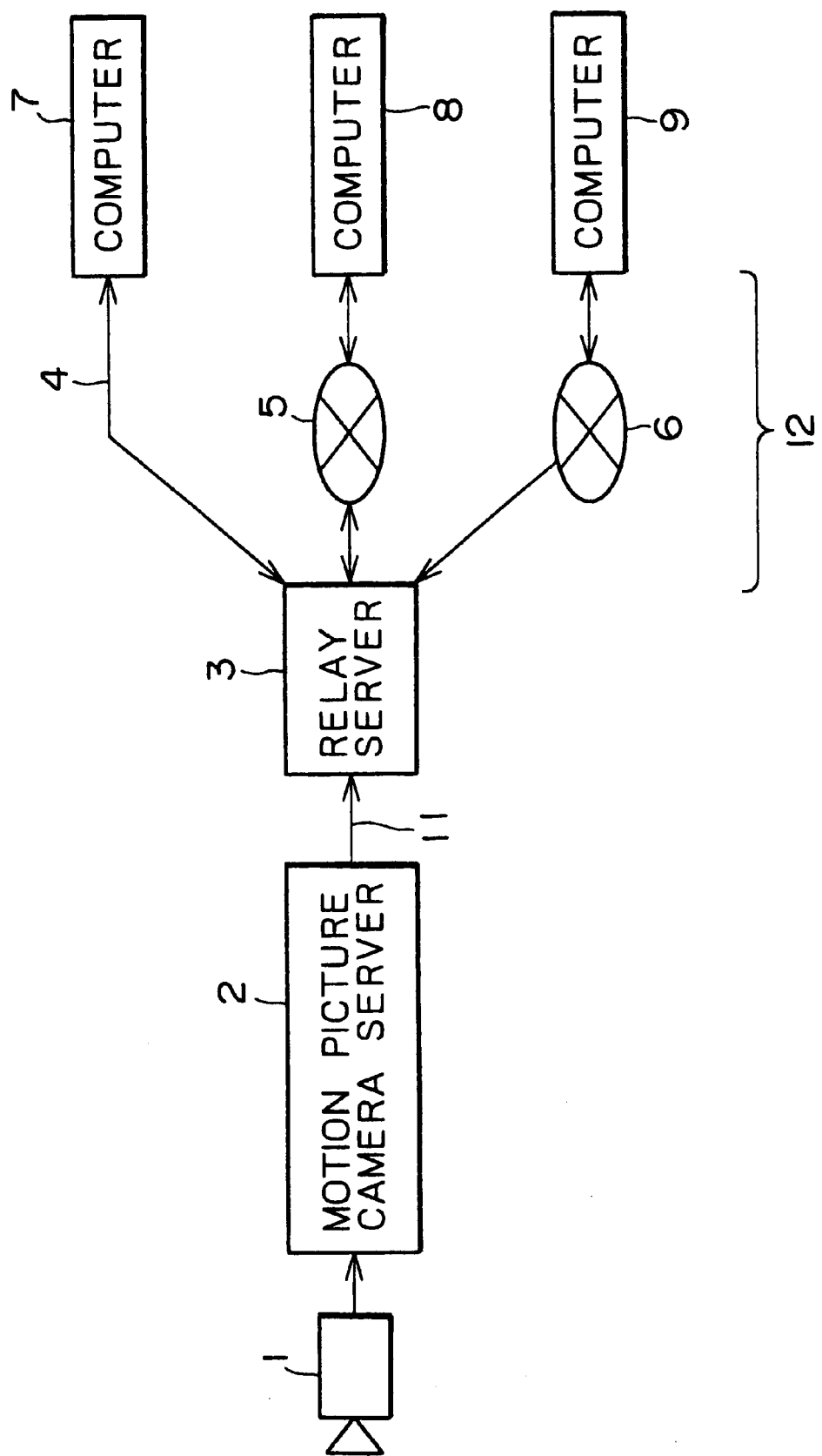
FIG. 2 shows a block diagram showing an example of the constitution of the first embodiment of an image transmission system according to the present invention.

Next, FIG. 2 shows an example of the constitution of an embodiment of an image transmission system according to the present invention.

Photographing a picture (motion picture) is performed with a video camera 1, and the obtained image data are supplied to a motion picture camera server 2. In the motion picture camera server 2, the image data from the video camera 1 are taken in and they are, for example, MPEG-encoded at a predetermined bit rate. The motion picture camera server 2 is connected to a relay server 3 through a high speed network 11 such as TCP/IP (Transmission control protocol/Internet protocol), etc. and the motion picture camera server 2 transfers the encoded data obtained in the result of MPEG-encoding to the relay server 3 through the high speed network 11.

The relay server 3 performs broadcasting by, for example, RTP (Real-time transport protocol) multi-cast through the low speed network 12 for computers, 7 to 9, owned by users (clients). In this place, the computers, 7 to 9, are connected to the relay server 3 through, as a low speed network 12, for example, Ethernet 4, analog public switched telephone network 5 (PSTN, etc.), or digital network 6 (ISDN, etc.), and the relay server 3, based on the aforesaid routine, changes the encoded data from the motion picture camera server 2 to the data of bit rates corresponding to the transmission rates of Ethernet 4, analog public switched telephone network 5 or the digital network 6 (in the case of the Ethernet 4, for example, 10 Mbps, in the case of the analog public switched telephone network, for example, 28.8 kbps, in the case of the digital network 6, for example, 64 kbps or 128 kbps) and transmits the data to the computers, 7 to 9, through respective transmission lines. In the computers, 7 to 9, the encoded data from the relay server 3 are received and decoded to be displayed.

Figure 3:
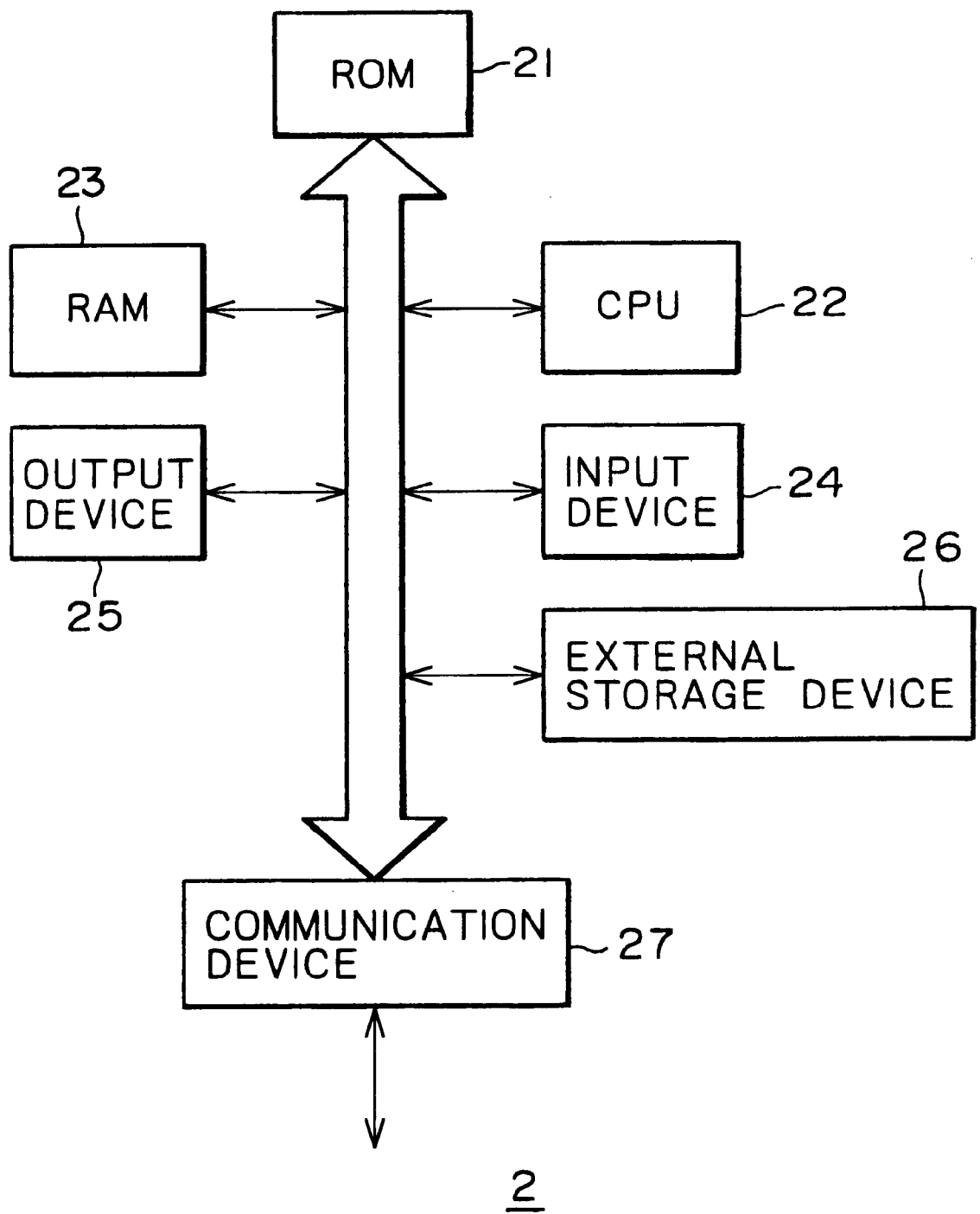
FIG. 3 shows a block diagram showing an example of the constitution of a motion picture camera server 2 shown in FIG. 2.

Next, FIG. 3 shows an example of the constitution of the motion picture camera server 2 shown in FIG. 1.

In the ROM (Read Only Memory) 21, for example, IPL (Initial Process Loading) program, etc. are stored. A CPU (Central Processor Unit) 22, for example, executes the OS (Operating System) program stored in an external storage device 26 following the IPL program stored in the ROM 21, and further, performs MPEG-encoding process of the image data from the video camera 1 or transfer process of the encoded data obtained in the result of the MPEG encoding process to the relay server 3 by executing various kinds of application programs stored in the external storage device 26 under the control of the OS. The RAM (Random Access Memory) 23 stores programs or data which are necessary to the operation of the CPU 22. The input device 24 includes, for example, a keyboard, a mouse, a microphone, etc. and it is operated when necessary data or commands are input. The output device 25 includes, for example, a display, a speaker, a printer, etc. and displays necessary information and outputs it. The external storage device 26 is constituted with a hard disc, etc. and stores the above-mentioned OS or application programs. The external storage device 26, besides the above, stores the data which are necessary to the operation of the CPU 22. The communication device 27 performs the control necessary to the communication of the video camera 1 or the relay server 3.

Figure 4:
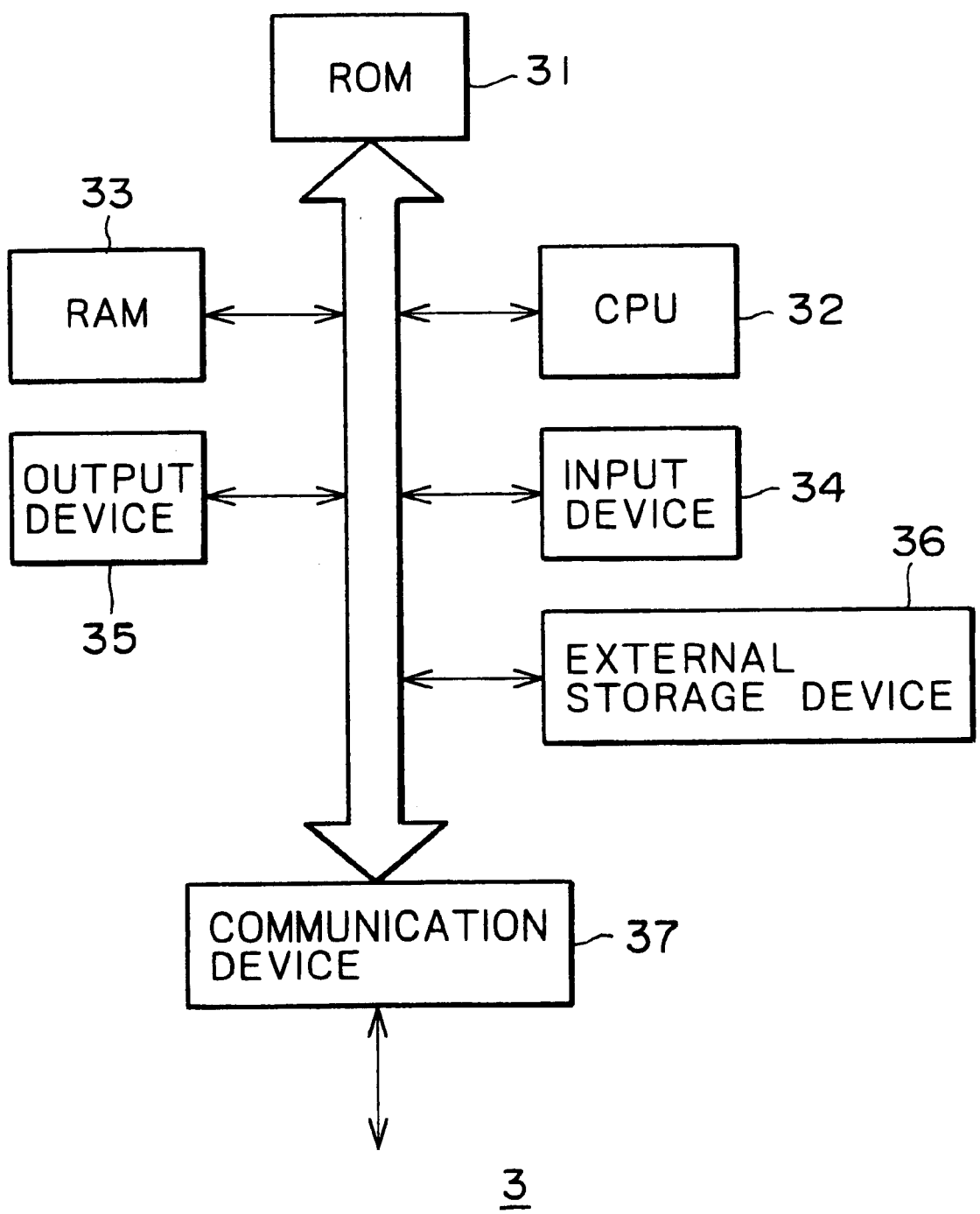
FIG. 4 shows a block diagram showing an example of the constitution of a relay server 3 shown in FIG. 2.

Next, FIG. 4 shows an example of the constitution of the relay server 3 shown in FIG. 1.

The relay server 3 is constituted with a series of parts, from a ROM 31 to a communication device 37, and it is basically constituted identically to the motion picture camera server 2 which is constituted with the series of parts, from ROM 21 to the communication device 27.

Further, in the external storage device 26, as application programs, for example, there are stored a program for changing the encoded data from the motion picture camera to the encoded data of a predetermined bit rate, a program for performing the RTP multi-cast, etc., and in the CPU 32 (control means), it is so arranged that the change of the bit rate of the encoded data, the transmission by RTP multi-cast of the encoded data whose bit rate has been changed, etc. are performed.

The communication device 37 (transmission means) controls the communication with the motion picture camera server 2 or the communication with the computers, 7 to 9, through the low speed network 12.

Figure 5:
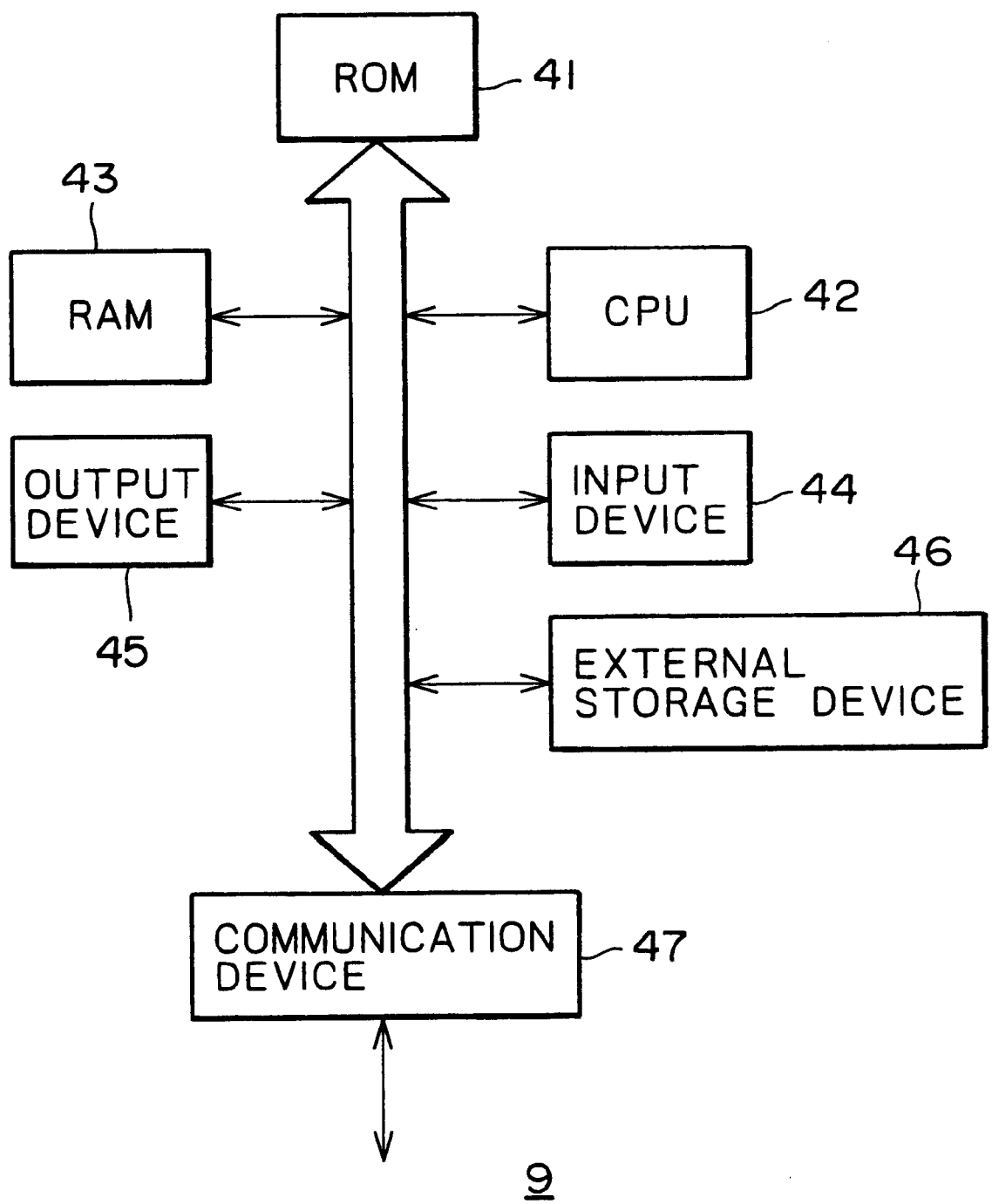
FIG. 5 shows a block diagram showing an example of the constitution of computers, 7 to 9, shown in FIG. 2.

Next, FIG. 5 shows an example of the constitution of the computers, 7 to 9, shown in FIG. 1.

The computers, 7 to 9, are constituted with a series of parts, from a ROM 41 to the communication device 47, and it is basically constituted identically with the motion picture camera server 2 which is constituted with a series of parts from the ROM 21 to the communication device 27.

However, for example, as the CPU 42, a part which is slower in processing speed compared to that of the CPU 22 is used, and as the RAM 43 or the external storage device 46, a part of smaller storage capacity compared to with that of the RAM 23 or the external storage device 26 is used.

In the external storage device 46, as application programs, for example, programs for receiving the encoded data from the relay server 3 and for displaying them in performing MPEG-decoding, etc. are stored, and in the CPU 42, the encoded data are received and they are MPEG-decoded to be displayed in executing these application programs. Further, the communication device 47 is arranged to control the communication with the relay server 3. The communication device 47 in the computer 8 which communicate with the relay server 3 through the analog public switched telephone network 5 is constituted with a modem, etc.

Figure 6:
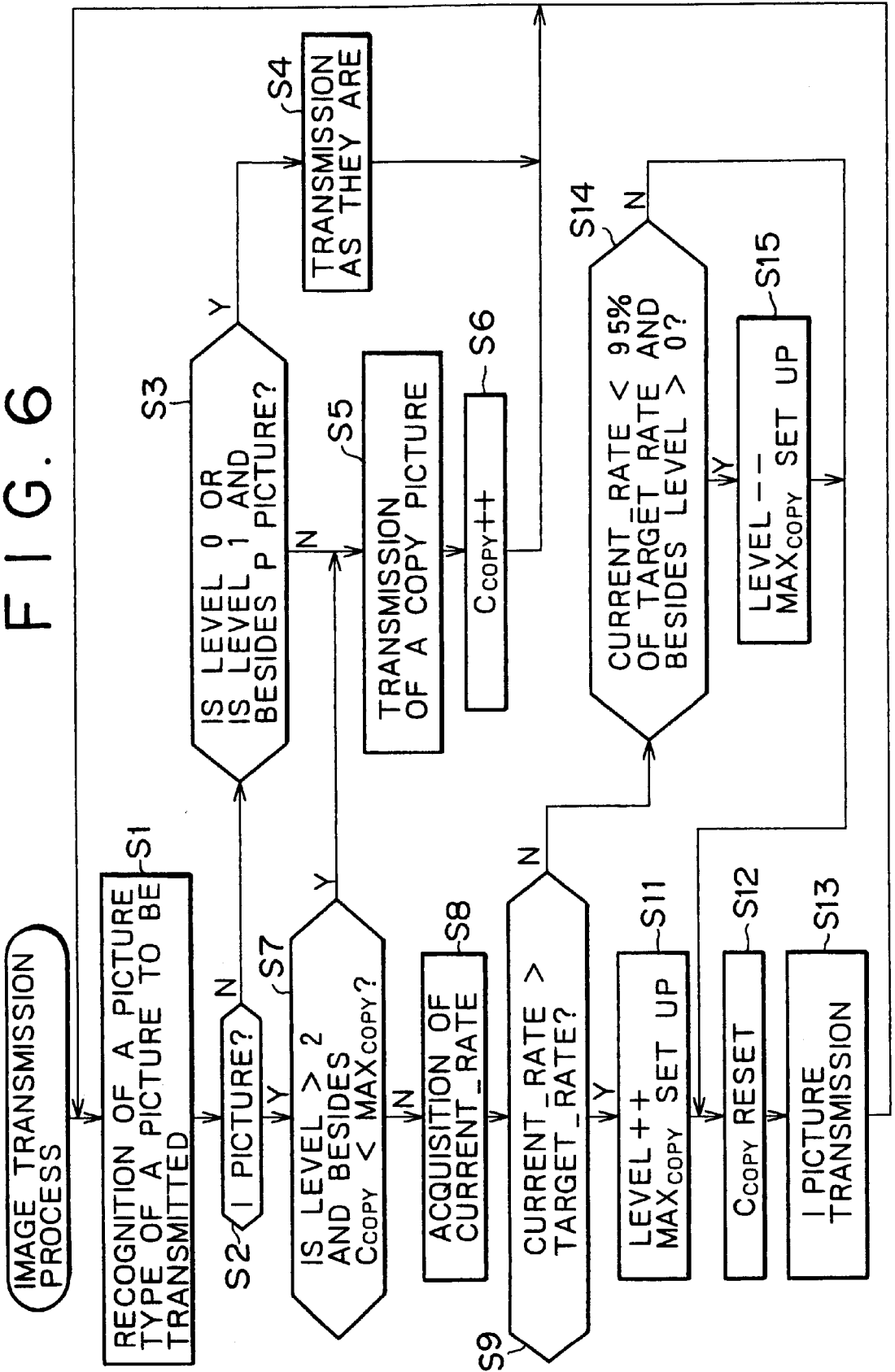
FIG. 6 shows a flowchart for illustrating the transmission process of a picture by the relay server 3.

Next, the transmission process of the encoded data to the computers, 7 to 9, by the relay server 3 will be further explained referring to the flowchart shown in FIG. 6.

In this case, it is assumed that a GOP of the encoded data which are sent from the motion picture camera server 2 and received by the relay server 3 is constituted, for example, with 15 pictures as shown in FIG. 1 and the number of I picture among them is (1).

When the relay server 3, for example, has an access from either one of the computers, 7 to 9, it establishes the connection (communication link) with the computer which accessed it, and the communication process is performed according to the flowchart shown in FIG. 6 in every established connection.

At first, in step S1, the CPU 32 recognizes the picture type of a picture corresponding to the encoded data to be transmitted. The recognition is performed, for example, by decoding a picture header. Then, the process is advanced to step S2, and in the CPU 32 it is judged whether the picture type recognized in step S1 is an I picture or not. In step S2, in the case where the picture type of the picture to be transmitted is judged not to be an I picture, the process is advanced to step S3, and it is judged whether the level as a variable, is (0) or not, and when the value of the level is (1), it is judged whether the picture type of a picture to be transmitted is a P picture or not.

In this case, the value of the level is a variable which shows the replacement with copy pictures is to be performed about only B pictures, about B pictures and P pictures, or about B pictures, P pictures and I picture, and the replacement is performed according to the value of the value of the level as shown in the following. In other words, when the value of the level is zero (0), the replacement with a copy picture is not performed about any picture. When the value of the level is (1), all B pictures are replaced with copy pictures, and when the value of the level is (2), all B pictures and all P pictures are replaced with copy pictures. When the value of the level is larger than (3), all B pictures, all P pictures and the I picture in the value of the level-2 frame are replaced with copy pictures. The value of the value of the level is set based on the difference between the transmission rate of the low speed network in which connection is established (target_rate) and the bit rate of the encoded data (current_rate). Therefore, the value of the value of the level expresses the difference between the transmission rate (target_rate) and the bit rate of the encoded data (current_rate).

When the value of the level is larger than (3), an I picture is also replaced with a copy picture, and, as explained in FIG. 1, when an I picture in a GOP is replaced with a copy picture, the GOP is absorbed in the previous GOP. Therefore, when the value of the level is larger than (3), the number of pictures which constitute a GOP can be as large as (level-1)×15. (The numeral 15 is, as explained in the above, the number of pictures which constitutes a GOP before the replacement with a copy picture is performed.). After the pictures are replaced with copy pictures, the maximum number of copy pictures can be, at maximum, (level-1)×15−1.

Hereinafter, the maximum number of copy pictures expressed by ((level-1)×15−1) may be referred to as MAX-$_{COPY}$.

In step S3, when it is judged that the value of the level is zero (0) or the value of the level is (1) and besides the picture type of a picture to be transmitted is a P picture, that is, when it is judged that any picture is not to be replaced with a copy picture, or only B pictures are to be replaced with copy pictures and a picture to be transmitted is a P picture, the process is advanced to step S4, and the CPU 32 controls the communication device 37 to transmit the encoded data as they are about the picture to be transmitted (in this case, P picture or B picture), and the process is returned to step S1. Thereby, in the communication device 37 the encoded data about the picture to be transmitted originally are transmitted as they are through the low speed network 12.

In step S3, when it is judged that the value of the level is not zero (0), and that the value of the level is one (1) and besides the picture type of a picture to be transmitted is not P picture, that is, a picture to be transmitted is a B picture and only B pictures are to be replaced with copy pictures, or a picture to be transmitted is a P picture and both B pictures and P pictures are to be replaced with copy pictures, the process is advanced to step S5, and the CPU 32 controls so as to transmit the copy pictures in place of the picture to be transmitted and the process is advanced to step S6. The communication device 37 transmits copy pictures in place of the encoded data about a picture to be transmitted originally through the low speed network 12.

In step S6, in the CPU 32, a $C_{COPY}$, a variable, which counts the number of pictures being the constituents of a GOP and replaced with copy pictures is incremented by 1 and process is returned to step S1.

On the other hand, in step S2, when it is judged that the picture type of a picture to be transmitted is an I picture, the process is advanced to step S7, and it is judged in the CPU 32 whether the value of the level is larger than two (2) and the $C_{COPY}$ is smaller than the $MAX_{COPY}$ or not. In step S7, when it is judged that the value of the level is larger than two (2) and the Ccopy is smaller than the $MAX_{COPY}$, that is, when it is judged that pictures of all picture types, B pictures, P pictures and I pictures, are to be replaced with copy pictures and the Ccopy, the number of pictures replaced with copy pictures is smaller than the $MAX_{COPY}$, the maximum value of the number of replaceable pictures, the process is brought back to step S5, and the CPU 32 controls the communication device 37 to transmit a copy picture in place of an I picture which is to be transmitted originally, and the process is advanced to step 6. Thereby, in the communication device 37, a copy picture is transmitted in place of the encoded data about an I picture through the low speed network 12.

In step S6, as mentioned in the above, $C_{COPY}$ is incremented by 1, and the process is brought back to step S1.

In step S7, when it is judged that the value of the level is less than 2, and the $C_{COPY}$ is not smaller than the $MAX_{COPY}$, the process is advanced to step S8, and the CPU 32 recognizes the bit rate (current_rate) of the encoded data which are being transmitted by the communication device 37, and the process is advanced to step S9. In other words, the CPU 32, for example, counts the number of bits of the encoded data which are being transmitted by the communication device 37 in units of a predetermined period of time, and based on the count value it recognizes the present bit rate (current_rate) of the encoded data being transmitted.

In step S9, it is judged in the CPU 32 if the bit rate (current_rate) is larger than the transmission rate (target_rate) of the low speed network 12 of which connection is established.

In this case, it is arranged that the CPU 32 recognizes the transmission rate (target_rate) of the low speed network 12, for example, as shown below. For example, the transmission rates of transmission lines (in the embodiment shown in FIG. 2, the Ethernet 4, analog public switched telephone network 5, and the digital network 6 as the low speed network 12) which are connected to users' computers, (in the embodiment shown in FIG. 2, computers, 7 to 9) are stored beforehand in the external storage device 36 concerning every user, thereby the CPU 32 recognizes the transmission rates (target_rate) of the transmission lines whose connections are established in the low speed network 12 in referring to the stored data. Another way of recognition by the CPU 32 is, for example, to arrange a computer having established connection to inform the CPU 32 of the transmission rate of the transmission line in the communication with the computer.

In step S9, when it is judged that the bit rate (current_rate) is larger than the transmission rate (target_rate), the process is advanced to step S11, and in the CPU 32, the value of the level, a variable, is incremented by one (1), and the $MAX_{COPY}$ is calculated again using the incremented level following the above-mentioned expression. In other words, when the bit rate (current_rate) is larger than the transmission rate (target_rate), more pictures are replaced with copy pictures; thereby, the value of the value of the level is increased to make the bit rate of the encoded data (current_rate) smaller than the transmission rate (target_rate). In step 11, it is possible to increase the value of the level by more than two (2).

Then the process is advanced to step S12, and the CPU 32 reset the $C_{COPY}$, for example, to zero (0), and the process is advanced to step S13. In the step S13, the CPU 32 controls the communication device 37 to transmit the encoded data about an I picture to be transmitted as they are, and the process is brought back to step S1. Thereby, in the communication device 37, the encoded data about the I picture which is to be transmitted originally are transmitted as they are through the low speed network 12.

On the other hand, in step S9, when it is judged that the bit rate (current_rate) is larger than the transmission rate (target_rate), the process is advanced to step S14, and in the CPU 32, it is judged if the bit rate (current_rate) is smaller than 95% of the transmission rate (target_rate) and the value of the level is larger than zero (0). In step S14, when it is judged that the bit rate (current_rate) is smaller than 95% of the transmission rate (target_rate) and that the value of the level is larger than zero (0), the process is advanced to step S15, and in the CPU 32 the value of the level, a variable, is incremented by one (1), and further, the $MAX_{COPY}$ is recalculated using the incremented level following the above-mentioned expression. In other words, when the bit rate (current_rate) is smaller than 95% of the transmission rate (target_rate), in order to be able to obtain a picture which is closer to the picture which can be obtained by decoding the encoded data which are originally to be transmitted, the value of the value of the level is decreased to make the number of copy pictures to be replaced less. In step S15, it is possible to decrease the value of the value of the level more than 2.

In step S14, when it is judged that the bit rate (current_rate) is not smaller than 95% of the transmission rate (target_rate) or that the value of the level is not larger than zero (0), that is, when the bit rate (current_rate) is in a proper range, that is, between the transmission rate (target_rate) and the 95% of the transmission rate, or when it is impossible to make the value of the value of the level less, the process is advanced to step S12 in skipping the step S15, and after that the same processes as mentioned in the above are performed.

As described in the above, in the relay server 3, the encoded data are transmitted whose bit rate is changed to a value which is in the range from the transmission rate (target_rate) of the low speed network 12 to the 95% of the tranmission rate. However, the lowest limit of the bit rate value of the encoded data to be transmitted can be a value other than the 95% of the transmission rate (target_rate).

In the relay server 3, when the encoded data which are changed in the bit rate are transmitted, a bit rate BR and a VBV (Video Buffering Verifier) delay VD which are disposed at a sequence header are changed to predetermined fixed value; thereby, the mode is changed to a variable bit rate (VBR) mode.

Figure 7:
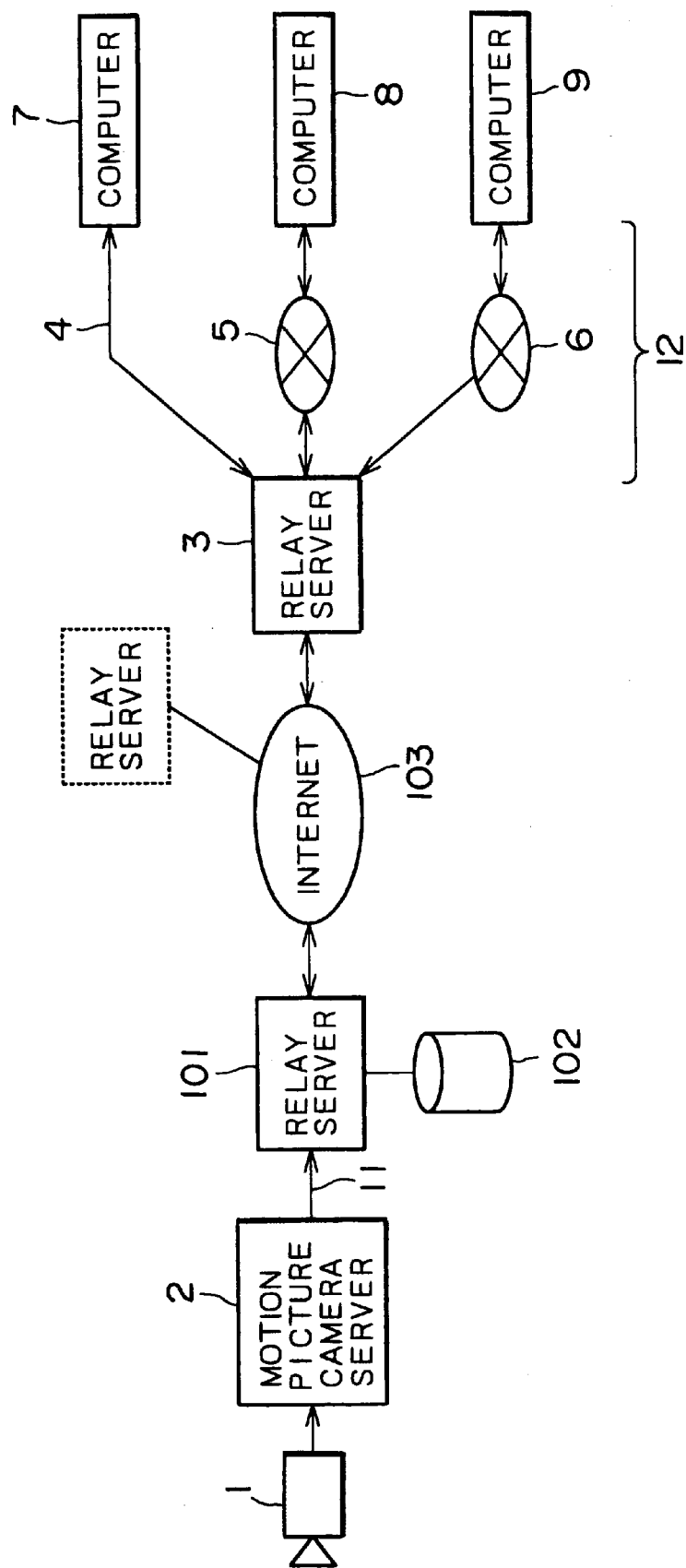
FIG. 7 shows a block diagram showing an example of constitution of the second embodiment of an image transmission system according to the present invention.

Next, FIG. 7 shows an example of the constitution of another embodiment of an image transmission system according to the present invention. In the figure, the parts which correspond to those shown in FIG. 2 are given identical symbols, and in the following, the explanation of them is omitted.

In the embodiment, the encoded data sent from the motion picture camera server 2 are received in a relay server 101, and transferred to the relay server 3 through the Internet 103. In the relay server 3, the same processes as described in the above are performed; thereby, the encoded data which are changed in the bit rate to correspond to the transmission rate of the low speed network are transmitted to the computers, 7 to 9.

It is possible to transmit the encoded data from a relay server 101 to any server (for example, a relay server shown in FIG. 7 with a broken line) on the Internet 103 except the relay server 3. It is also possible in the relay server 101 to store the encoded data from the motion picture camera server 2 once in a storage medium 102 and transmit the stored encoded data at a predetermined timing. Further, it is also possible to store the encoded data in the storage medium 102 in parallel with the transmission of the encoded data to the relay server 3.

As mentioned in the above, based on the value of the level, a variable, which corresponds to the difference between the bit rate (current_rate) and the transmission rate (target_rate), copy pictures are transmitted in place of pictures to be transmitted originally, so that the bit rate of the encoded data can be changed adaptively. Thus it doesn't need to prepare encoders for encoding at various bit rates in the motion picture camera server 2, nor need to transmit encoded data having such various kinds of bit rates from the motion picture camera server 2. Therefore, the band width of the transmission line (in the embodiments shown in FIG. 2 and FIG. 7, the high speed network 11) can be narrower in comparison with the case where the encoded data of various kinds of bit rates are transmitted (in other words, where more band width is used for the transmission of other data.).

When the encoded data whose bit rate are changed is changed in the mode of variable bit rate, they can be the data based on the MPEG ratings, and further, the number of pictures are not changed before and after the changes, so that the encoded data after the change in the bit rate can be played back normally with an MPEG decoder of a standard type (not like a played back picture in rapid traverse).

Further, for example, as shown in FIG. 7, when the encoded data are transmitted through the Internet 103, normally it is necessary to transmit the encoded data of bit rates corresponding to the transmission rates of, for example, 3 transmission lines, Ethernet 4, analog public switched telephone network 5 and the digital network 6 to the relay server 3 through the Internet 103. However, when a communication line as the traffic on the routes is busy, it may not be possible to transmit all these data having 3 kinds of bit rates in real-time. In this case, it is not possible to transmit encoded data of a user being connected with an transmission line of a transmission rate corresponding to the bit rate of the encoded data which cannot be transmitted. In other words, in this case, the number of connectable users is limited. In contrast to this, in the case where bit rates are changed in the relay server 3, only the encoded data at a certain bit rate are to be transmitted, the frequency of occurrence of the trouble as mentioned in the above can be decreased.

As a method of decreasing the bit rate, for example, there is a method in which higher order components of DCT (Discrete-Cosine-Transformation) coefficient included in the encoded data are made zero (0) and so on. However, in this method, it is necessary to decode the encoded data at a level at which DCT coefficient can be obtained, and further, after the higher order components of the DCT coefficient are cut off, the data have to be encoded again. In contrast to this, in the case where the encoded data to be transmitted originally are replaced with copy pictures, there is no need to decode the encoded data and only light processes are needed, for example, such that the sequence header or the picture header is detected and the bit rate BR, VBV delay VD, picture type, etc. are changed.

In the present embodiment, the case where broadcasting is performed by multi-cast (for example, IP multi-cast) is explained. However, it is also possible to apply the present invention to the broadcasting by uni-cast (for example, IP uni-cast).

In the present embodiment, broadcasting in real-time is explained. However, the present invention can be applied to, for example, VOD (Video On Demand) service in which data are stored in a storage medium beforehand and they are distributed at need.

For example, in the VOD service, the same movie, etc. are distributed to a plurality of users at the same time, and in this case, even if the transmission lines for respective users have different transmission rates from each other, by performing the transmission as explained in the above, there becomes no need to store the encoded data of a plurality of kinds of bit rates corresponding to a plurality of transmission rates. As a result, the trouble to prepare a plurality of encoded data is saved and further it is made possible to utilize the storage medium more efficiently.

In the present embodiment, pictures are MPEG-encoded. However, the encoding system of pictures is not limited to MPEG.

As a matter of fact, when the difference between the maximum value and the minimum value of the transmission rates of transmission lines in the low speed network 12 is large, sometimes it may be difficult to generate all kinds of encoded data corresponding to such a wide range of transmission rates from the encoded data at one kind of bit rate. In such a case, encoded data of several kinds of bit rates will be prepared and the encoded data at a proper kind of bit rate will be changed. In this case, it is necessary to prepare encoded data at several kinds of bit rates. However, still, it is possible to decrease the number of kinds of encoded data in comparison with the case where all kinds of encoded data corresponding to all kinds of transmission rates of transmission lines in the low speed network 12 are prepared.

What is claimed is:

1. An image transmission device for transmitting encoded data which are obtained by encoding the data of an image to be transmitted through a transmission line at the predetermined transmission rate, comprising:

transmission means for transmitting said encoded data; and control means for controlling said transmission means to transmit the data instructing to generate a copy picture by copying a picture corresponding to the encoded data transmitted previously based on the difference between the bit rate of said encoded data and said predetermined transmission rate, in place of said encoded data to be transmitted originally;

wherein said encoded data are obtained by encoding the data of an image based on the ratings of MPEG (Moving Picture Experts Group); and further wherein said control means controls said transmission means to transmit the data instructing to generate the copy picture by copying the picture corresponding to the encoded data transmitted previously, in place of the encoded data only B pictures.

2. The device of claim 1, wherein even when said control means controls said transmission means to transmit the data instructing to generate the copy picture by copying the picture corresponding to the encoded data transmitted previously, in place of the encoded data about a B picture, if the bit rate of said encoded data is not less than the predetermined transmission rate, said control means further controls said transmission means to transmit the data instructing to generate the copy picture by copying the picture corresponding to the encoded data transmitted previously, in place of the encoded data about a P picture.

3. The device of claim 2, wherein even when said control means controls said transmission means to transmit the data instructing to generate the copy picture by copying the picture corresponding to the encoded data transmitted previously, in place of the encoded data about the B picture and the P picture, if the bit rate of the encoded data is not less than said predetermined transmission rate, said control means further controls said transmission means to transmit the data instructing to generate a copy picture copying a picture corresponding the encoded data transmitted previously, in place of the encoded data about an I picture.

4. The device of claim 1, wherein even when said control means controls said transmission means to transmit the data instructing to generate the copy picture by copying the picture corresponding to the encoded data transmitted previously, in place of the encoded data about the B picture and the P picture, if the bit rate of the encoded data is not less than said predetermined transmission rate, said control means further controls said transmission means to transmit the data instructing to generate a copy picture copying a picture corresponding the encoded data transmitted previously, in place of the encoded data about an I picture.

5. An image transmission method for transmitting encoded data which are obtained by encoding the data of an image to be transmitted through a transmission line at the predetermined transmission rate, comprising the steps of:

transmitting said encoded data; and controlling said transmitting step to transmit the data instructing to generate a copy picture by copying a picture corresponding to the encoded data transmitted previously based on the difference between the bit rate of said encoded data and said predetermined transmission rate, in place of said encoded data to be transmitted originally;

wherein said encoded data are obtained by encoding the data of an image based on the ratings of MPEG (Moving Picture Experts Group), and further wherein said step of controlling further includes the step of controlling said transmitting step to transmit the data instructing to generate the copy picture by copying the picture corresponding to the encoded data transmitted previously, in place of the encoded data only B pictures.

6. The method of claim 5, wherein even when said controlling step controls the transmitting step to transmit the data instructing to generate the copy picture by copying the picture corresponding to the encoded data transmitted previously, in place of the encoded data about a B picture, if the bit rate of said encoded data is not less than the predetermined transmission rate, said controlling step further including the step of controlling the transmitting step to transmit the data instructing to generate the copy picture by copying the picture corresponding to the encoded data transmitted previously, in place of the encoded data about a P picture.

7. The method of claim 6, wherein even when said controlling step controls said transmitting step to transmit the data instructing to generate the copy picture by copying the picture corresponding to the encoded data transmitted previously, in place of the encoded data about the B picture and the P picture, if the bit rate of the encoded data is not less than said predetermined transmission rate, said controlling step further including the step of controlling said transmitting step to transmit the data instructing to generate a copy picture copying a picture corresponding the encoded data transmitted previously, in place of the encoded data about an I picture.

8. The method of claim 5, wherein even when said controlling step controls said transmitting step to transmit the data instructing to generate the copy picture by copying the picture corresponding to the encoded data transmitted previously, in place of the encoded data about the B picture and the P picture, if the bit rate of the encoded data is not less than said predetermined transmission rate, said controlling step further including the step of controlling said transmitting step to transmit the data instructing to generate a copy picture copying a picture corresponding the encoded data transmitted previously, in place of the encoded data about an I picture.

9. An image transmission device for transmitting encoded data which are obtained by encoding the data of an image to be transmitted through a transmission line at the predetermined transmission rate, comprising:

a transmission unit for transmitting said encoded data; and a controller for controlling said transmission unit to transmit the data instructing to generate a copy picture by copying a picture corresponding to the encoded data transmitted previously based on the difference between the bit rate of said encoded data and said predetermined transmission rate, in place of said encoded data to be transmitted originally;

wherein said encoded data are obtained by encoding the data of an image based on the ratings of MPEG (Moving Picture Experts Group); and further wherein said controller controls said transmission unit to transmit the data instructing to generate the copy picture by copying the picture corresponding to the encoded data transmitted previously, in place of the encoded data only B pictures.

10. The device of claim 9, wherein even when said controller controls said transmission unit to transmit the data instructing to generate the copy picture by copying the picture corresponding to the encoded data transmitted previously, in place of the encoded data about a B picture, if the bit rate of said encoded data is not less than the predetermined transmission rate, said controller further controls said transmission unit to transmit the data instructing to generate the copy picture by copying the picture corresponding to the encoded data transmitted previously, in place of the encoded data about a P picture.

11. The device of claim 10, wherein even when said controller controls said transmission unit to transmit the data instructing to generate the copy picture by copying the picture corresponding to the encoded data transmitted previously, in place of the encoded data about the B picture and the P picture, if the bit rate of the encoded data is not less than said predetermined transmission rate, said controller further controls said transmission unit to transmit the data instructing to generate a copy picture copying a picture corresponding the encoded data transmitted previously, in place of the encoded data about an I picture.

12. The device of claim 9, wherein even when said controller controls said transmission unit to transmit the data instructing to generate the copy picture by copying the picture corresponding to the encoded data transmitted previously, in place of the encoded data about the B picture and the P picture, if the bit rate of the encoded data is not less than said predetermined transmission rate, said controller further controls said transmission unit to transmit the data instructing to generate a copy picture copying a picture corresponding the encoded data transmitted previously, in place of the encoded data about an I picture.

* * * * *